3,020,264
PROCESS FOR THE PRODUCTION OF EUPOLY-OXYMETHYLENES WITH SULFUR CATALYST

Jürgen Behrends, Hanau (Main), Otto Schweitzer, Konigstein (Taunus), and Werner Kern, Mainz, Germany, and Heinrich Hopff, Zurich, Switzerland, assignors to Deutsche Gold- und Silber-Scheideanstalt vormals Roessler, Frankfurt am Main, Germany
No Drawing. Filed Jan. 6, 1960, Ser. No. 690
Claims priority, application Germany Jan. 7, 1959
15 Claims. (Cl. 260—67)

The present invention relates to an improved process for the production of eupolyoxymethylenes.

The object of the present invention is to produce eupolyoxymethylenes with novel thermoplastic properties in good yields.

Eupolyoxymethylenes can be produced by several different processes. Among these processes, for example, there is the technique of polymerizing monomeric formaldehyde in an inert liquid medium in the absence of water and in the presence of dispersing agents and polymerization catalysts, such as, aliphatic or aromatic amines. Such processes are disclosed in U.S. 2,768,994 and "High Molecular Organic Compounds" (Die hochmolekularen organischen Verbindungen), H. Staudinger and W. Kern, 1932, pages 280–287. Trialkylarsines, trialkylstibines and trialkylphosphines have also been used as catalysts in these type polymerizations. Furthermore, it is also known to the art that formaldehyde can be polymerized at lower temperatures in solvents in the presence of sulfuric acid or boron trichloride. The polymerization can also be conducted so that a small portion of the total quantity of formaldehyde to be polymerized is first polymerized before the remaining major portion is polymerized and this smaller quantity of polymer is then separated from the as yet unpolymerized major portion of the monomer with any impurities that may be present.

It has also been suggested that monomeric formaldehyde be polymerized in the presence of a sulfur compound which contains the structural element

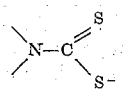

in order to produce eupolyoxymethylenes having increased thermal resistance. Sulfur compounds of this type include, for example, thiouram disulfide, tetramethyl thiouram disulfide, 2-mercaptobenzothiazol and the like.

It has now been found, according to the invention, that eupolyoxymethylenes can be produced in good yields if monomeric formaldehyde, which has been relieved as much as possible of moisture, is polymerized in the presence of sulfur which has been suspended or dissolved in dried benzine and/or decalin. If a suspension is to be used, the sulfur should be present therein in as fine a suspended form as possible. In this regard it is advantageous to use colloidal sulfur. The average particle size of the suspended sulfur should be smaller than 200μ, preferably smaller than 50μ. Such fine particle sizes can be obtained, for example, by a mechanical comminution of the sulfur in commercially available dispersion devices.

The suspension or solution, according to the process of this invention may, for example, contain 0.1 to 2.0 and preferably 0.3 to 1.0 g. of sulfur per liter.

According to the invention it is important that the benzine or decalin that is used be as dry as possible. It is preferable to use, in this regard, benzine or decalin that has been dried with sodium, particularly with a sodium suspension. Furthermore, it is advantageous to use a benzine which has a boiling point of between 100 to 140° C.

The process of this invention can be conducted with a rhombic sulfur, commercially available flowers of sulfur or advantageously with a ventilated pure sulfur. Of particular utility is the monoclinic form of sulfur. The best results can be obtained, however, by the use of a macromolecular sulfur modification which is insoluble in rubber. A macromolecular sulfur modification of this type, for example, is available under the tradename "Crystex."® So-called plastic sulfur can also be used with success in the process of this invention if it is so comminuted with a highly effective dispersion device, preferably in dry benzine, directly after it is produced.

Furthermore, it has been found according to the invention, that it is often expedient to use, in addition to the sulfur, one or more compounds which are known per se, as rubber vulcanizing agents. Among these are those compounds which contain the structural element

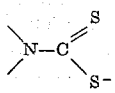

as, for example, thiouram disulfide, tetramethylthiouram disulfide, 2-mercaptobenzothiazol and the like.

In addition, other known formaldehyde polymerization catalysts can be used together with the sulfur with good results. Among such catalysts there are notably the amines and in particular tertiary amines. With this combination of sulfur and other catalysts it is possible to obtain formaldehyde polymerizates which are noted for their increased thermal stability. It is preferable in this regard to use a sulfur to amine ratio of approximately 3:1.

Moreover, it has also been found in the process of this invention, that it is advantageous to the attainment of higher yields that the monomeric formaldehyde be carefully dried before the polymerization is conducted. To this end, it has been found very suitable to dry the monomeric formaldehyde by treating it with an aluminum silicate gel, particularly with such a gel which contains a higher $SiO_2$ content, of about 80 to 90%. It is preferable in this regard that the gel be agitated during the drying process. By means of this gel-agitation technique it is possible to separate the oligomeric formaldehydes forming during the drying process and to recycle them again through the monomeric formaldehyde forming and drying process. This new drying process is disclosed in German application D 29 715.

It is particularly advantageous to use a monomeric formaldehyde in the process of this invention which has a water content of less than 0.1%.

For the production of the monomeric formaldehyde it is possible to also use, besides paraformaldehyde α polyoxymethylene, lower and higher molecular weight formaldehyde polymers and trioxane, preferably highly purified trioxane. The process can be carried out at any temperature which lies between the melting-point and the boiling point of the liquid medium employed. In carrying out the process of this invention, a dry monomeric formaldehyde gas is introduced into the suspension or solution of sulfur in dry benzine or decalin. The eupolyoxymethylenes thereby precipitate out in the form of white flocks. After the flocks are filtered from the reaction medium they can be dried, for example, in air. The eupolyoxymethylenes thus produced can be further processed, using well known techniques, to make commercially feasible shaped objects such as sheets, fibers, foils, tubing and the like. Where necessary, the sulfur residues that may be present in the polymerizates can be removed therefrom by treatment with suitable solvents.

The eupolyoxymethylenes produced according to the invention can be readily worked up into formed bodies in the customary thermoplastic processes, such as, for example, extrusion molding, pressing and the like, or they can be used to coat objects. When desirable, it is also possible to conduct the process of this invention in the presence of other known materials for improving the workability of the eupolyoxymethylenes and/or their stability and/or the mechanical properties of the shaped bodies produced therefrom. Among such materials are plasticizers, such as the glycols, particularly propylene glycol and stabilizers, such as urea, hydrazine and the like.

According to the process of this invention the eupolyoxymethylenes are obtained in yields up to about 40 to 50%. These eupolyoxymethylenes have an average molecular weight of about 20,000 to 60,000 and are particularly suitable for admixture with very high molecular weight eupolyoxymethylenes in order to improve the flow characteristics of the latter. The molecular weight of the eupolyoxymethylenes produced by the process of this invention can be regulated within the above-mentioned limits almost at will by the selection of a particular type or modification of sulfur and/or by combining the sulfur with other known catalysts and/or the choice of a particular grain size for the sulfur.

In addition, fillers and/or coloring agents can also be used in admixture with the eupolyoxymethylenes of this invention. Materials of this type include, a particular, glass fibers and mineral wool.

It is also advantageous, in this regard, to use highly dispersed, particularly, active fillers, for example, carbon black, and notably alkaline carbon black, or oxides of metals or metalloids such as aluminum oxide, titanium oxide, zirconium oxide or silicon dioxide, which have been produced by decomposing volatile compounds of these metals and metalloids at a high temperature in an oxidizing or hydrolyzing medium.

The process according to the invention can also be conducted continuously. To this end the unreacted monomeric formaldehyde is recycled and any oligomeric formaldehydes that are formed are also recycled after cracking. The homogeneous catalyst distribution is expediently maintained with procedures known to the art of polymerization techniques.

The following examples are illustrative of the process of this invention but are not intended as a limitation upon its scope.

*Example 1*

200 g. of paraformaldehyde were suspended in about 300 ml. of paraffin oil and heated to a maximum temperature of 165° C. while introducing a slow stream of air in such a way that the total quantity of paraformaldehyde was completely decomposed to the monomeric formaldehyde gas within about 2 to 2½ hours. The formaldehyde gas thus produced, after being passed through two cooled separators which were maintained at a temperature of —15 to —18° C., was continuously introduced into a suspension of 1.8 g. of monoclinic sulfur in 2.2 l. of dry benzine. This sulfur suspension was maintained in motion by means of a magnetic stirrer. The polymerization reaction began at once, the temperature climbed within 2 hours from 22.5° to 44° C., and the resulting eupolyoxymethylenes precipitated out as dense flocks. The eupolyoxymethylenes were suction filtered, washed with benzine and dried in the air. The yield was 79 g. or 39.5% of the theoretical. The loss of polymer due to vaporization after 20 minutes at 200° C. amounted to 60%. The molecular weight of this polymer was 34,700. The product was compressed into a tough, translucent film under a pressure of at least 70 kg./cm.² at a temperature of 180 to 190° C. The benzine used in this and the other examples had been dried by treating it with suspended sodium. Its boiling point was 100–140° C. The monoclinic sulfur had an average particle size of 44μ. The monomeric formaldehyde gas which had been dried in the cooled separators had a moisture content of 0.01%.

*Example 2*

Monomeric formaldehyde gas which had been produced from 200 g. of paraformaldehyde and purified as in Example 1 was continuously introduced at room temperature into a suspension of 2.0 g. of monoclinic sulfur in 2 liters of dry benzine which had been produced by a dispersion device. After the initiation of the polymerization the temperature in the reaction vessel climbed from 23° to 48° C. within 2½ hours. After the termination of the reaction the eupolyoxymethylenes which had settled out as a dense white precipitate were suction filtered, washed and dried. The yield was 100 g. or 50% of the theoretical. The vaporization loss after 20 minutes at 200° C. was 59.6%. The molecular weight of this polymer was 54,500 and it was compressed into tough, translucent films and sheets at a temperature of 180 to 190° C. under a pressure of about 100 kg./cm.². The benzine used in this example had been dried by treating it with suspended sodium and it had a boiling point of 100 to 140° C. The monoclinic sulfur had an average particle size of 60μ.

*Example 3*

A eupolyoxymethylene was produced as in Examples 1 and 2 by introducing monomeric dry formaldehyde into a fine particle sized suspension of 2.5 g. of monoclinic sulfur in 2.2 l. of dry benzine. The temperature inside the reaction vessel climbed from 24° to 44° C. within 2 hours. The polymer was processed into a film as in Example 1. The yield was 90 g. or 45% of the theoretical. The loss by vaporization after 20 minutes at 200° C. was 77.5%. The benzine was the same as that used in Examples 1 and 2. The sulfur had an average particle size of 100μ.

*Example 4*

200 g. of dry, monomeric formaldehyde was polymerized within 2 hours in a fine particle sized suspension of 0.6 g./l. of a high molecular, rubber insoluble sulfur (trademark "Crystex") in dry benzine. During the polymerization the temperature rose from 20.5° to 47.5° C. 95 g. of a loose, eupolyoxymethylene was thereby produced which had a molecular weight of 20,000 and a vaporization loss of 86% after 20 minutes at 200° C. The formaldehyde contained less than 0.1% moisture and the average particle size of the sulfur corresponds to a fineness of 100% through #80 U.S. sieve. The benzine was the same as that used in Examples 1 and 2.

*Example 5*

Formaldehyde gas produced from 200 g. of paraformaldehyde and purified as in Example 1 was continuously introduced into and polymerized in a suspension of 0.6 gr. of flowers of sulfur in 2 l. of dry benzine for two hours. The yield was 66 g. or 33% of the theoretical. The polymer had a vaporizaiton loss of 86.1% after 20 minutes at 200° C. The benzine was the same as used in Examples 1 and 2 and the sulfur had an average particle size of 500μ.

*Example 6*

200 g. of paraformaldehyde were suspended in 300 ml. of paraffin oil and was then heated to 140 to 160° C. to produce a steady stream of monomeric formaldehyde gas. The crude monomeric gas was then conducted through a water cooled column which was filled with an aluminum silicate gel which contained 80 to 90% SiO₂ and thereby relieved of its impurities, notably water. The highly purified monomeric formaldehyde emanating from the cooling tower was thereafter continuously polymerized in a solution of 0.4 g. of a very fine particle sized, pure sulfur in 2.2 l. of dry benzine into which the monomer was continuously introduced. With 2½ hours the temperature in the reaction vessel had climbed from 27° to 32° C. 26 g. of eupolyoxymethylenes were thereby produced. The polymer had a vaporization loss of 88.1% after 20 minutes at 200° C. The monomeric formaldehyde had a moisture content of less than 0.1%. The benzine was the same as used in Examples 1 and 2 and the sulfur had an average particle size of 50µ.

*Example 7*

A stream of monomeric formaldehyde gas produced and purified as in Example 6 was polymerized within 2 hours in a solution of 1.5 g. of pure sulfur in 2.2 l. of dry benzine during which time the temperature climbed from 24° to 31° C. 30 g. of eupolyoxymethylene were thereby produced. The polymer had a vaporization loss of 88.7% at 200° C. after 20 minutes. The benzine was the same as that used in Examples 1 and 2 and the sulfur had an average particle size of 50µ.

*Example 8*

Monomeric formaldehyde gas was polymerized as described in Example 1 in the presence of an amine alone and in the presence of ventilated sulfur combined with the amine. The results are given below in the following table. They show that when sulfur is used in combination with an amine the resulting polymers exhibit greater resistance to heat than those produced using an amine alone.

| Amount of catalyst used per 2.2 l. of Benzine | Yield, percent | Vaporization loss after 20 minutes at 200° C., percent |
|---|---|---|
| 0.11 g. tributylamine | 33 | 45.3 |
| Do | 47 | 70.4 |
| Do | 28 | 97.2 |
| Do | 16 | 64.2 |
| Average | 31 | 69.3 |
| 0.11 g. tributylamine+0.3 g. pure sulfur (ventilated) | 35 | 19.75 |
| 0.3 g. pure sulfur (ventilated) | 36 | 13.95 |
| Do | 25 | 29.10 |
| Do | 45 | 49.50 |
| average | 35 | 28.1 |

*Example 9*

A polymerization was conducted as in Example 1, however 2 g. of a plastic sulfur which had been converted into a very fine particle sized material immediately after it had been produced by means of a highly effective, commercially available dispersion device was used as the catalyst. The average particle size of the sulfur was 500µ and it was suspended in dry benzine. The polymerization took about 2.5 hours during which time the temperature rose from 21.5° to 34° C. The yield was 32%. The loss of polymer due to vaporization after 20 minutes at 200° C. was 20.1%.

*Example 10*

Example 9 was repeated with the difference that the suspension additionally contained 50 mg. tetramethyl thiouram disulfide. The polymerization took about 2.5 hours during which time the temperature rose from 20° to 38° C. The yield was 35%.

*Example 11*

Example 9 was repeated with the difference that the suspension additionally contained 50 mg. of piperidine salt of the pentamethylene dithiocarbamic acid. The polymerization took about 2.5 hours during which time the temperature rose from 20° to 41° C. The yield was 40%. The polymerization product showed a very good thermal stability.

*Example 12*

Example 1 was repeated with the difference that instead of the benzine the same quantity of decalin was used. The polymerization took about 2 hours during which time the temperature rose from 20° to 32° C. The yield was 30%.

*Example 13*

Example 1 was repeated with the difference that instead of benzine 2.2 l. of a mixture of benzine and trichloroethylene (75:25) was used. The polymerization took about 1.5 hours during which time the temperature rose from 20° to 45° C. The yield was 40%.

Within this invention benzine is used as a preferred liquid medium, but also good results can be obtained with decalin. Furthermore, the above-mentioned liquid media may contain up to 50% of a halogenated hydrocarbon, preferably trichloroethylene.

Crystex® which is preferably used in the process of this invention, is refined by a unique Stauffer process of Super Sublimation. In form, Crystex is a fluffy powder of extremely bright yellow color. It contains a minimum of 85% of the amorphous allotrope of sulfur, which is completely insoluble. The amorphorus allotrope is a thermoplastic high polymer with a molecular weight between 100,000 and 300,000. In physical properties it resembles thermoplastics and elastomers.

Crystex has no definite melting point but softens appreciably at 70° C. (158° F.) and becomes a highly viscous fluid at 90° C. (194° F.) If held at this temperature for several hours, Crystex reverts from its thermoplastic amorphous form to the rhombic crystalline form. The latter melts at 114° C. (237° F.) and is soluble in carbon bisulfide.

We claim:

1. A process for the production of eupolyoxymethylenes comprising polymerizing monomeric formaldehyde in contact with elemental sulfur in a liquid medium selected from the group consisting of benzine and decalin under essentially water-free conditions.

2. A process as in claim 1 in which said sulfur is suspended in said liquid medium.

3. A process as in claim 2 in which said sulfur has an average particle size of less than 200µ.

4. A process as in claim 3 in which said sulfur has an average particle size of less than 50µ.

5. A process as in claim 1 in which said liquid medium contains 0.1 to 2.0 g. of sulfur per liter.

6. A process as in claim 5 in which said liquid medium contains 0.3 to 1.0 g. of said sulfur per liter.

7. A process as in claim 1 in which said liquid medium has been dried with sodium.

8. A process as in claim 2 in which said sulfur is selected from the group consisting of monoclinic sulfur, fine particle sized plastic sulfur and macromolecular, rubber insoluble sulfur.

9. A process as in claim 1 in which said liquid medium also contains a rubber vulcanizing agent selected from the group consisting of thiuram disulfide and tetramethyl thiuram disulfide.

10. A process as in claim 1 in which said liquid medium also contains, as a second formaldehyde polymerization catalyst in addition to said sulfur, at least one amine.

11. A process as in claim 10 in which said amine is a tertiary amine.

12. A process as in claim 1 in which said monomeric formaldehyde has a moisture content of less than 0.1%.

13. A process as in claim 12 in which said monomeric formaldehyde has been dried by treating it with an aluminum silicate gel having an $SiO_2$ content of 80 to 90%.

14. A process as in claim 1 in which said liquid medium also contains up to 50% halogenated hydrocarbons.

15. A process as in claim 14 in which said halogenated hydrocarbon is trichloroethylene.

References Cited in the file of this patent

UNITED STATES PATENTS 2,848,437    Langsdorf et al. _____ Aug. 19, 1958